United States Patent [19]

van Dyke

[11] 4,447,781

[45] May 8, 1984

[54] MAGNETORESISTIVE TRANSDUCER APPARATUS

[75] Inventor: Martin J. van Dyke, Brooklyn Park, Minn.

[73] Assignee: Honeywell Inc., Minneapolis, Minn.

[21] Appl. No.: 310,580

[22] Filed: Oct. 13, 1981

[51] Int. Cl.³ .......................................... H03D 15/00
[52] U.S. Cl. ........................... 324/83 A; 324/DIG. 1; 324/252
[58] Field of Search .............. 324/83 A, 83 R, 117 R, 324/120, 127, 251, 252, DIG. 1; 338/32 R; 307/308, 309

[56] References Cited

U.S. PATENT DOCUMENTS 2,946,955  7/1960  Kuhrt ................................. 324/252
3,546,579 12/1970  Paul et al. ......................... 324/252
4,321,529  3/1982  Simmonds et al. ............... 324/83 A Primary Examiner—Michael J. Tokar
Assistant Examiner—Brenda J. Kelley
Attorney, Agent, or Firm—Mitchell J. Halista; Trevor B. Joike

[57] ABSTRACT

A magnetoresistive transducer bridge is operated in a saturation mode by an AC signal in an adjacent conductor. The field produced by the AC signal in the adjacent conductor is of sufficient amplitude to magnetically saturate the bridge elements in a pair of opposite arms of the bridge during most of each half cycle of the AC signal. During each zero-crossing of the applied signal, the bridge comes out of saturation and produces a signal pulse. Thus constituting a zero-crossing detector. This response characteristic is utilized in circuitry producing a current-presence detector, a signal amplitude detector, and a power-factor detector.

10 Claims, 8 Drawing Figures

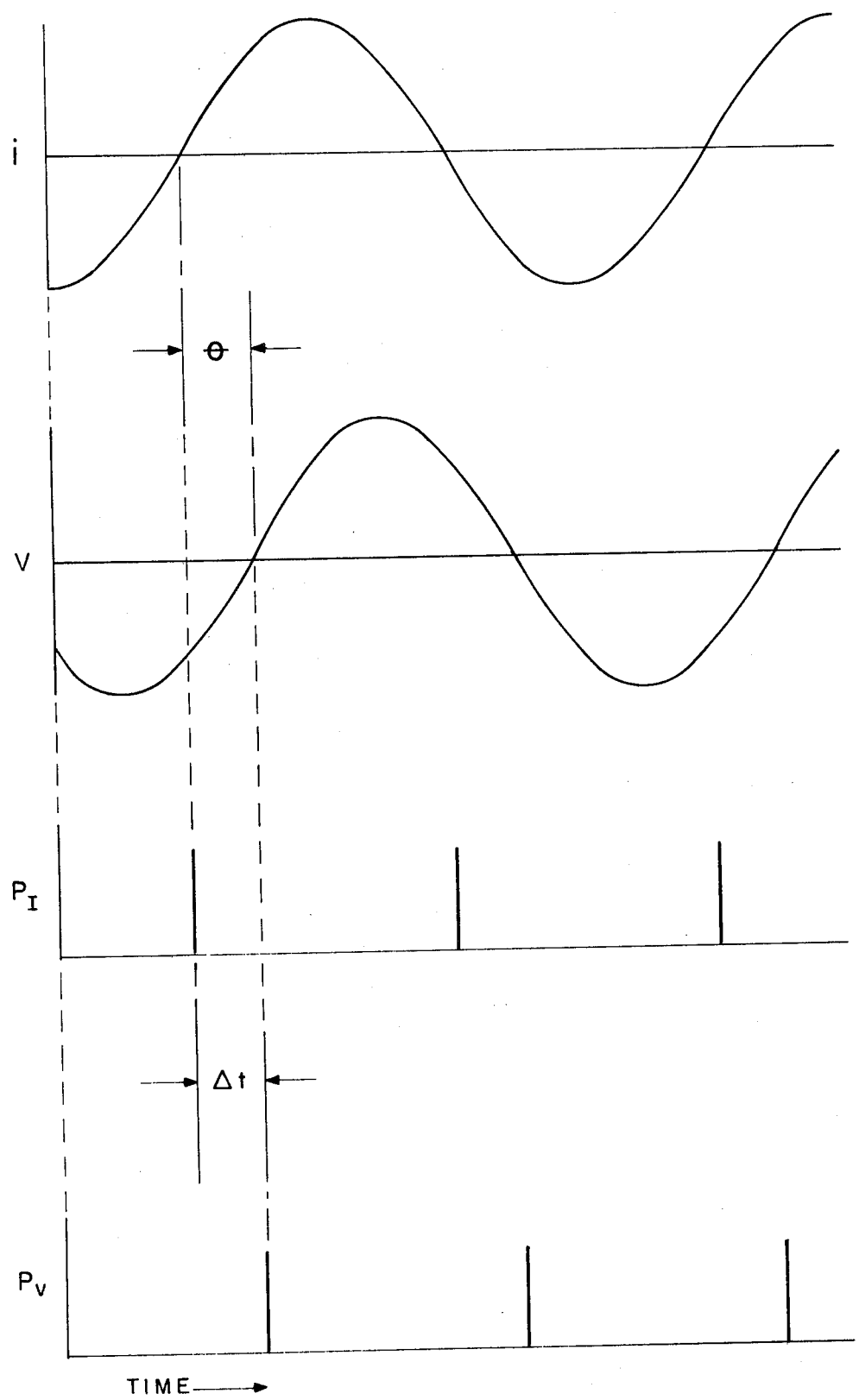
F I G. 8

MAGNETORESISTIVE TRANSDUCER APPARATUS

BACKGROUND OF THE INVENTION

The present invention relates to magnetoresistive transducers. More particularly, it relates to detector circuits utilizing the unique characteristics of magnetoresistive transducers.

Magnetoresistive transducers are elements formed of a magnetic material such as that known in the art as Permalloy, which exhibits a change in its electrical resistance as a function of an applied magnetic field. An additional feature of such magnetoresistive materials is that they are directionally sensitive relative to the direction of the field. That is, if the magnetic field lies parallel to the longitudinal dimension of the magnetoresistive elements, the resistive change response characteristic is significantly less than if the magnetic field lies transverse of the longitudinal dimension of the magnetoresistive elements, assuming the longitudinal polarization of the element. These characteristics of the magnetoresistive elements have enabled their use, heretofore, in circuits including bridge circuits for detecting ambient magnetic fields or, when the elements are placed adjacent to a current carrying conductor, have been used to detect the flow of current through that conductor. In this latter connection, such magnetoresistive elements have frequently been used in what has been defined as DC transformers. In such applications, the magnetoresistive transducers are operated in such manner as to provide an output signal which is a function of the magnitude of the applied magnetic field. Also because of the characteristics of the magnetoresistive elements, they have found their primary utility in responding to uni-directional or DC type fields.

SUMMARY OF THE INVENTION

It is an object of the present invention to provide an AC signal responsive magnetoresistive transducer.

It is another object of the present invention to provide a zero-crossing detector embodying a magnetoresistive transducer.

It is a further object of the present invention to provide improved detector circuits embodying the magnetoresistive transducers as set forth.

In accomplishing these and other objects, there has been provided, in accordance with the present invention, a magnetoresistive transducer bridge which is operated in a saturation mode by an AC signal in an adjacent conductor. The field produced by the AC signal in the adjacent conductor is of sufficient amplitude to magnetically saturate the bridge elements in a pair of opposite arms of the bridge during most of each half cycle of the AC signal. During each zero-crossing of the applied signal, the bridge comes out of saturation and produces a signal pulse as zero-crossing detector. This response characteristic is utilized in circuitry producing a current-presence detector, a signal amplitude detector, and a power-factor detector.

BRIEF DESCRIPTION OF THE DRAWINGS

A better understanding of the present invention may be had from the following detailed description when read in the light of the accompanying drawings in which:

FIG. 8 is a set of curves helpful in understanding the operation of the circuit illustrated in FIG. 7.

DETAILED DESCRIPTION

Figure 1:
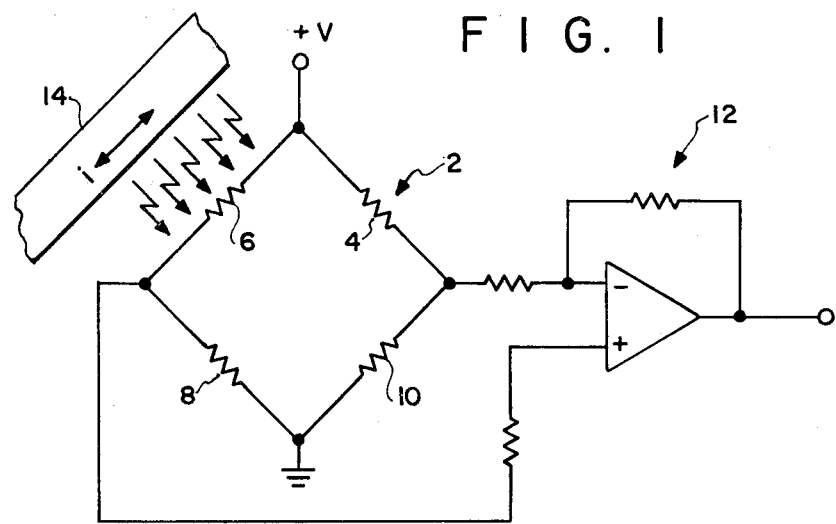
FIG. 1 is a schematic representation of magnetoresistive transducer embodying the present invention.

Referring now to the drawings in more detail, there is shown in FIG. 1 a schematic representation of a magnetoresistive transducer 2. The transducer 2 includes a four-armed bridge circuit, each arm including a magnetoresistive element 4, 6, 8, and 10, respectively. The junction between the elements 4 and 6 is connected to a positive source of current while the junction between the elements 8 and 10 is connected to ground. The junction between the elements 6 and 8 is connected to one input terminal of an amplifier 12 while the junction between the elements 4 and 10 is connected to the other input terminal of the amplifier 12. While the resistive elements 4, 6, 8, and 10 have been shown relatively large on the drawing, they may in fact be quite small, on the order of one hundredth of an inch. Such transducers may then be placed in close proximity to but insulated from a conductor 14 through which an electrical current may flow. When current flows through the conductor 14, a magnetic field is generated by the flow of that current, the field or flux lying transverse of the direction of the flow through the conductor 14. When the transducer 2 is positioned adjacent the conductor 14 in such a way that two of the magnetoresistive resistive elements 4 and 8 lie in a direction which is parallel to the magnetic flux generated by the current flow through the conductor 14 and the other two magnetoresistive elements 6 and 10 are perpendicular to that flux, changes in that flux causes a corresponding change in the output signal across the input terminals of the amplifier 12. The transducer 2 is arranged such that in the absence of magnetic flux from the conductor 14, the arms of the bridge are electrically balanced. Consequently, current flowing from the positive voltage supply source through the arms of the bridge is balanced and a net potential difference of substantially zero is applied to the input terminals of the amplifier 12. When current is flowing in the conductor 14, the resulting magnetic flux causes the resistance of the elements 6 and 10 to change by a different amount from the change in elements 4 and 8, thereby unbalancing the bridge. The unbalance of the bridge results in a net potential difference being applied to the input terminals of the amplifier 12.

In conventional magnetoresistive current detection circuits, the current in the conductor is unidirectional, or DC, and the coupling between the resulting magnetic flux and the magnetoresistive elements is such that the resulting output signal applied to the input terminals of the amplifier 12 is substantially proportional to the magnitude of the current flow in the conductor 14. In the present case, however, it is expected that the current flowing through the conductor 14 will be an alternating current and that the amplitude of the alternating signal is such that when coupled to the magnetoresistive elements by the resulting magnetic flux from the conductor 14, for a significant part of each half cycle the flux density will be sufficient to cause the magnetoresistive elements 6 and 10 to be magnetically saturated. That saturation, in turn, causes the bridge transducer 2 to be unbalanced to produce a maximum output signal to the input terminals of the amplifier 12.

Figure 2:
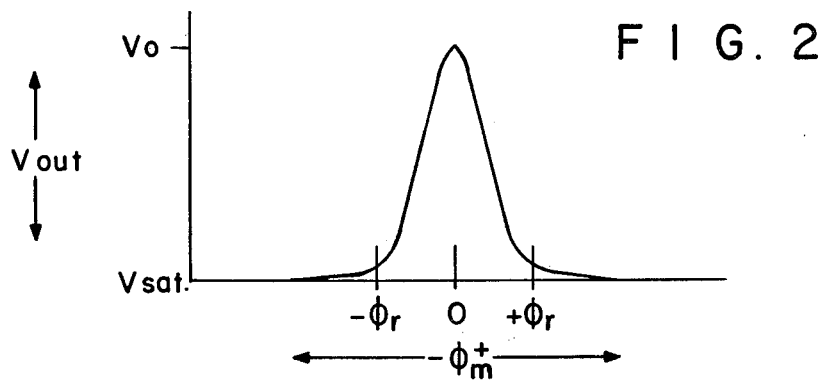
FIG. 2 is a chart illustrating the characteristic output signal of a transducer shown in FIG. 1.

As illustrated in FIG. 2, the output voltage of the bridge of the transducer 2 is at a saturation level until the signal in the conductor 14 approaches the zero crossing point. At that point, the magnetoresistive elements drop out of saturation because the resulting flux has diminished below the saturation level, restoring the bridge circuit toward a balanced condition. At that point of zero crossing of the alternating signal, the magnetic flux emanating from the conductor is substantially zero and the bridge circuit of the transducer 2 is substantially in balance. At that point the output of the bridge to the input terminals of the amplifier 12 is substantially zero volts. Then as the signal crosses over into the second phase of the alternating signal, the magnetic flux again increases to the point of saturation returning the output voltage to the saturation level. Thus, at each zero crossing of the signal in the conductor 14 there will be produced an output pulse from the transducer bridge, as illustrated in FIG. 2. The amplifier 12 will invert that signal.

Figure 3:
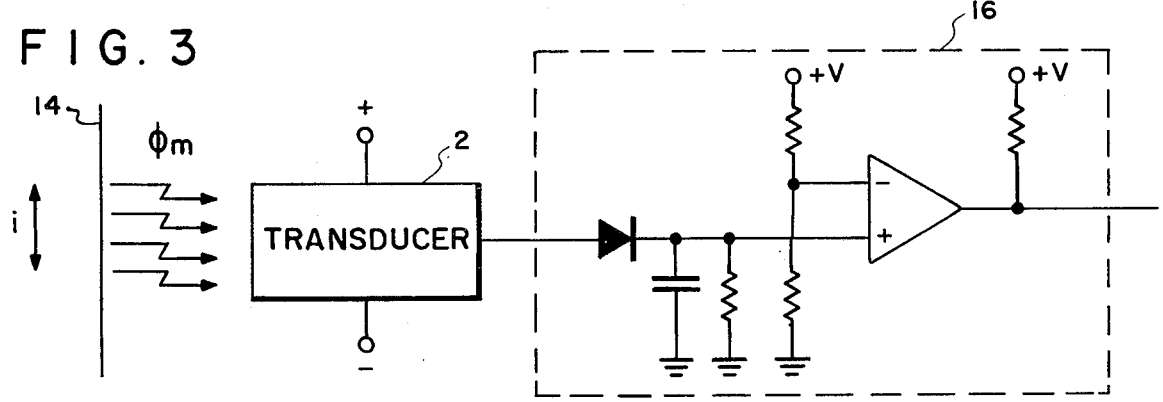
FIG. 3 is a schematic block diagram of a current-presence detector embodying the present invention.
Figure 4:
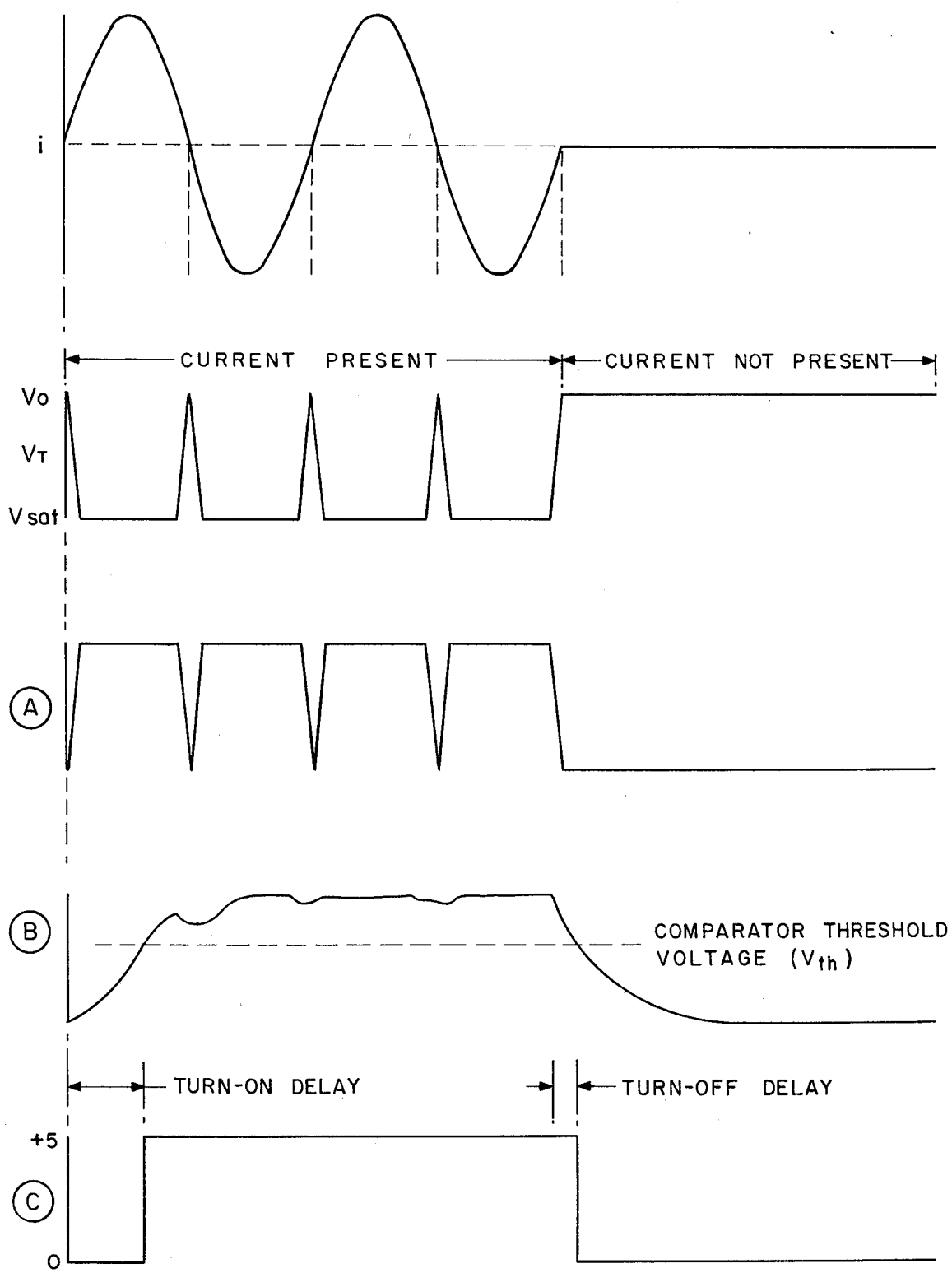
FIG. 4 is a set of curves helpful in understanding the circuit in FIG. 3.

In FIG. 3 there is illustrated a presence-of-current detector circuit which utilizes the transducer and the response characteristic thereof as illustrated in FIGS. 1 and 2. In the current detector circuit, the transducer 2 is again positioned in magnetic coupling relationship with the conductor 14. The output of the transducer 2 is connected to a pulse detector circuit 16. The pulse detector circuit 16 may be any of a number of well known pulse detector circuits such as the comparator illustrated. In FIG. 4 there is shown a set of curves illustrating the operation of the circuit shown in FIG. 3 in accordance with the present invention. In curve i of FIG. 4 there is shown in alternating current signal which is present for a portion of the graph and then is absent. In curve $V_t$ of FIG. 4 it may be seen that a saturated output voltage from the transducer bridge appears with pulses to $V_o$ occuring at each of the zero crossings of the alternating signals. However when the alternating signal ceases, the pulse signals also cease. In curve A, the signal at the output of the amplifier 12 is the inversion of the bridge output signals. Curve B illustrates the envelope of the signals of curve A developed by the input network of the detector circuit. In curve C of FIG. 4, it may be seen that when the output pulses from the transducer 2 are applied to the input of the pulse detector 16, there is a voltage level signal designated +5 during the time that a signal is present on the conductor 14 and during the time that the envelope of curve B exceeds the threshold voltage. When, however, the signal on the conductor ceases, and the corresponding pulses from the output of the transducer also cease, the voltage level at the output of the pulse detector 16 changes to a level designated 0 indicating an absence of signal on the conductor 14. The output signal from the pulse detector 16 may then be applied to the input of any utilization device such as alarms, recorders or the like.

Figure 5:
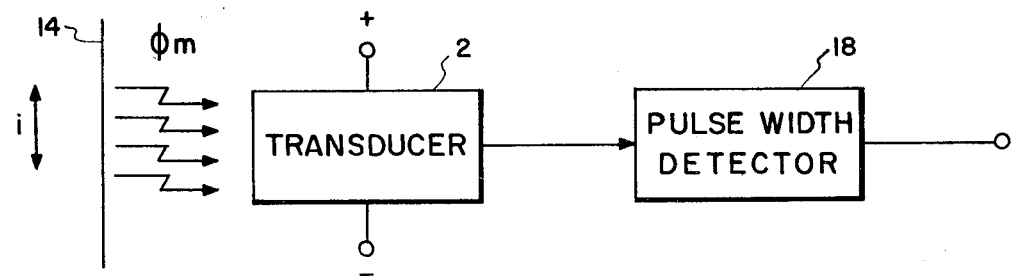
FIG. 5 is a schematic block diagram illustrating a current signal amplitude detector embodying the present invention.
Figure 6:
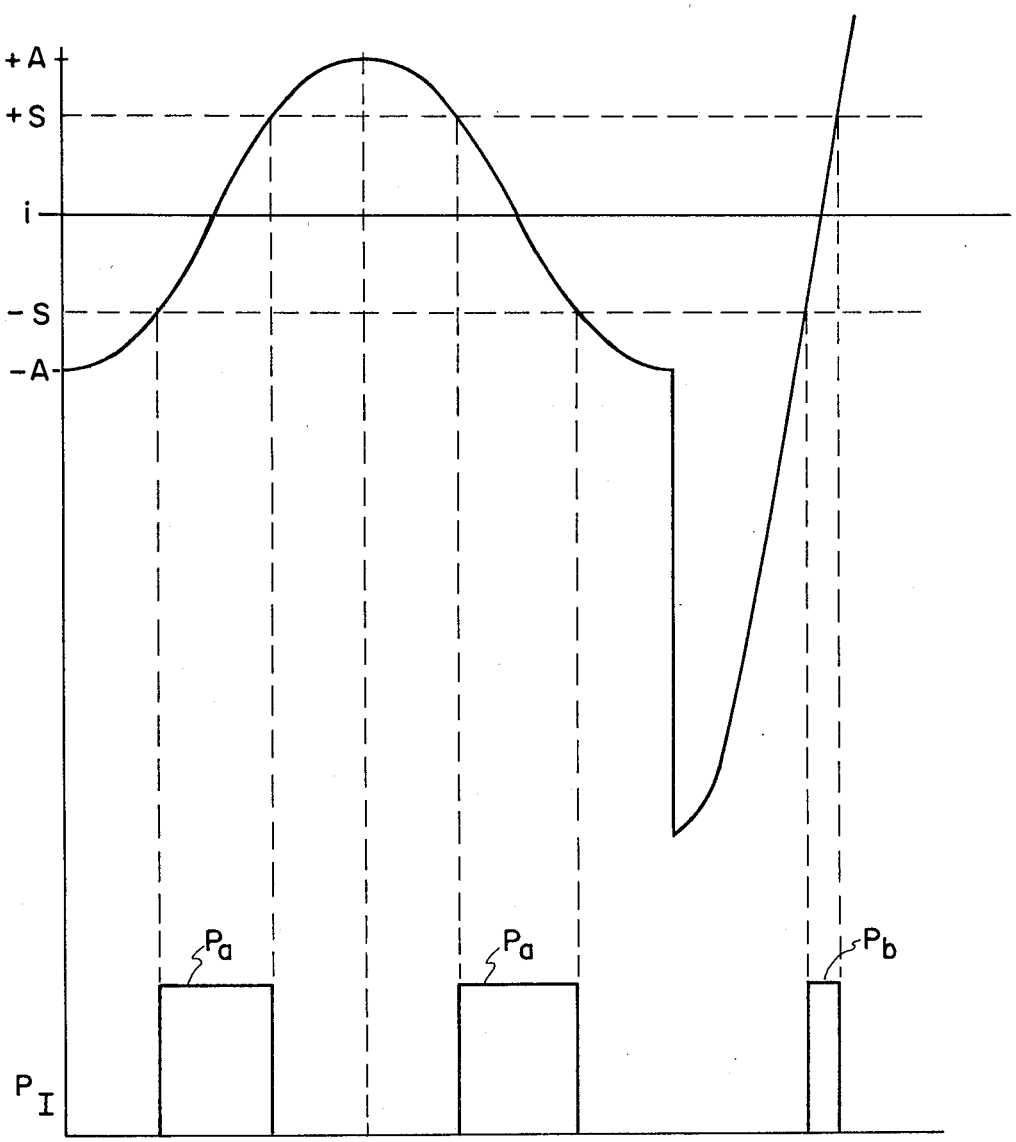
FIG. 6 is a set of curves helpful in understanding the circuit illustrated in FIG. 5.

In FIG. 5 there is illustrated a signal amplitude detector circuit utilizing the transducer and the characteristics thereof illustrated in FIGS. 1 and 2. In the signal amplitude detector as illustrated in FIG. 5, the transducer 2 is again positioned in close proximity to a conductor 14 in which alternating signal current will flow. The output of the transducer 2 is connected to the input of a pulse width detector 18. With reference to the curves of FIG. 6 it may be seen that if an alternating signal, illustrated in curve i of FIG. 6 has an amplitude of plus or minus A as indicated in the initial portion of curve i, the slope of that curve has a predetermined value. If the coupling with the magnetoresistive elements is such that at an amplitude value of plus or minus S, the affected magnetoresistive elements 4 and 8 become saturated, then the width of the unsaturated portion of the curve will have a corresponding pulse width as indicated by pulses $P_a$ on the curve $P_f$ of FIG. 6. The width of the pulse $P_a$ will be determined by the slope of the current curve at the zero crossing region. If, as indicated on the curve i of FIG. 6, there is a significant change in the amplitude of the current flowing through the conductor 14, the slope of the curve in the zero crossing region will change correspondingly. If, as indicated, there is an increase in the amplitude in the signal current, there will be a corresponding increase in the slope of the curve at the zero crossing region. That increase in the slope of the curve in the zero crossing region will produce a correspondingly narrower pulse as an output signal from the transducer 2 as indicated by the pulse $P_b$. With the output of the transducer 2 connected to the input of a pulse width detector 18 which may be any of several well-known types, the output signal from the pulse width detector will be a signal having a magnitude representative of the amplitude of the signal on the conductor 14.

Figure 7:
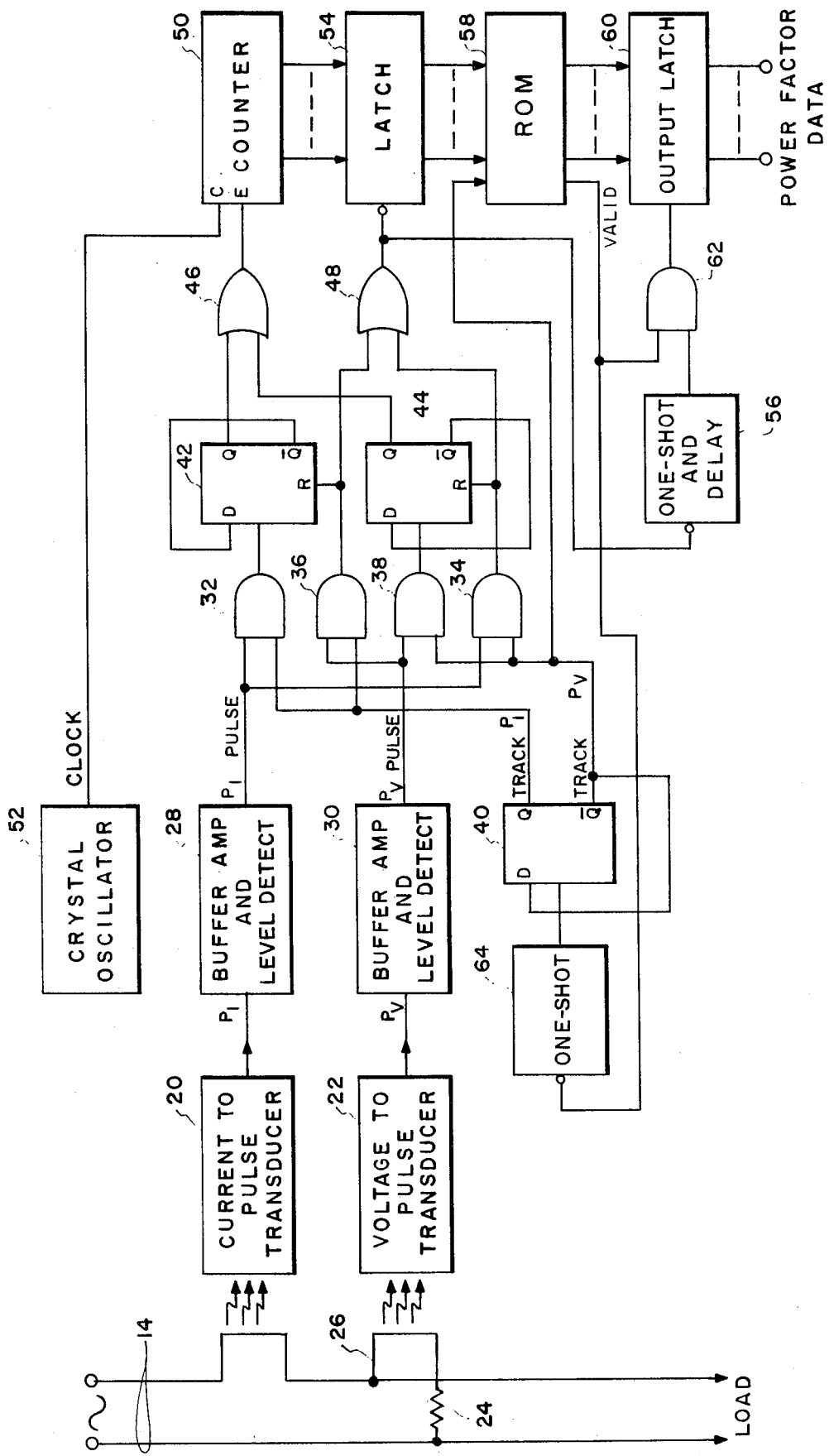
FIG. 7 is a schematic block diagram illustrating a power factor sensor embodying the present invention.

In FIG. 7, the conductor 14 is illustrated as a two-wire conductor. A first transducer 20 is designated a current-to-pulse transducer and is magnetically coupled to the conductor 14 to respond to the alternating current signal therein. The transducer 20 is of the type illustrated in FIG. 1 and produces a series of pulses indicative of the zero crossings of the alternating current signal in the conductor 14.

A second transducer 22 is designated voltage-to-pulse transducer. A resistor 24 connected across the two leads of the two wire conductor 14 provides a current signal in a current loop 26 which corresponds to the voltage developed across the resistor 24. The transducer 22 is also preferably of the type shown in FIG. 1 and responds to the current flowing through the loop 26. Effectively, the output of the transducer 22 is a series of pulses indicative of the zero crossing of the voltage signal across the two wire conductor 14. Thus, two pulse trains are developed, the one from the transducer 20 representing the zero crossings of the current signal and the one from the transducer 22 representing the zero crossings of the voltage signal in the transmission line 14. The current pulses from the transducer 20 are applied as input signals to a buffer amplifier and level detect circuit 28. Similarly, the voltage pulses from the transducer 22 are applied as input signal to a buffer amplifier and level detect circuit 30. The level detector in each of the two buffer amplifiers is primarily for the purpose of distinguishing between valid signals and noise pulses.

The output current pulses from the amplifier 28 are applied to one input terminal of a first AND gate 32 as well as to the first input terminal of a second AND gate 34. The voltage pulses from the buffer amplifier 30 are applied to a first input terminal of each of a third and a fourth AND gate 36 and 38. The second input terminal of each of the AND gates 32 and 36 is connected to the Q output of a flip-flop 40. The second input terminal of each of the two AND gates 34 and 38 is connected to the $\overline{Q}$ output terminal of the flip-flop 40. The output terminal of the AND gate 32 is connected to the clock input terminal of a flip-flop 42. The output terminal of the AND gate 36 is connected to the reset input terminal of the flip-flop 42. Similarly, the output terminal of the AND gate 38 is connected to the clock input terminal of a flip-flop 44 wile the output terminal of the AND gate 34 is connected to the reset input terminal of the flip-flop 44. The D input terminal of each of the flip-flops 40, 42, and 44 are all connected to the $\overline{Q}$ output terminals, respectively.

The Q output terminal of the flip-flop 42 and the Q output terminal of the flip-flop 44 are connected, respectively, to the two input terminals of an OR gate 46. The output terminal of the AND gate 36, is further connected to one input terminal of a second OR gate 48. The output terminal of the AND gate 34 is also connected to the other input terminal of the OR gate 48. The output of the OR gate 46 is connected to the ENABLE input terminal of a counter 50, which has its clock or counting input terminal connected to the output of a crystal oscillator 52. The output of the counter 50 is connected in parallel to the input of a latch 54. The clock input terminal of the latch 54 is connected to the clock output terminal of the OR gate 48. The output of the OR gate 48 is also connected to the clock input terminal of a one-shot 56.

The output signals from the latch 54 are applied as input or address signals to a ROM 58. The $\overline{Q}$ output of the flip-flop 40 is also applied as a control input signal to the ROM 58, as will be discussed in more detail hereinafter. The output of the ROM 58 is connected to the input terminals of an output latch 60. The clock input terminal of the output latch 60 is connected to the output terminal of an AND gate 62, one input terminal of which is, in turn, connected to the output terminal of the one-shot 56. The ROM 58 also includes an output signal which is indicative that the signal received from the latch 54 is a valid signal. That "valid" output signal is applied as a second input signal to the AND gate 62. The same signal line is connected to the input terminal of a one-shot 64, the output terminal of which is connected to the clock input terminal of the flip-flop 40.

In operation, it will first be assumed that the current pulses are leading the voltage pulses. Thus the pulses from the current-to-pulse transducer 20 are applied through the buffer amplifier 28 to produce the current pulse output signals applied to the input of the AND gates 32 and 34. The gates 32 and 36 are enabled by the normal state output from the flip-flop 40. With the AND gate 32 enabled, the current pulse applied to the input thereof causes the flip-flop 42 to be triggered to produce a logical high at the Q output terminal thereof. That logical high from the flip-flop 42 is transmitted through the OR gate 46 to the ENABLE input terminal of the counter 50.

When the counter 50 is enabled it begins to count clock pulses from the crystal oscillator 52. When the voltage pulse causes the AND gate 36 to produce an output signal, the output signal from the AND gate 36 causes the flip-flop 42 to reset, removing the enabling signal from the counter 50. Accordingly, the number of pulses counted by the counter 50 is representative of the time difference between the current pulse and the voltage pulse. The same signal, i.e., the output from the AND gate 36 which stopped the counting of the counter is also transmitted through the OR gate 48 to clock the count from the counter 50 into the latch 54. The number from the latch 54 transferred to the ROM 58 addresses information in the ROM which then outputs a signal representative of the power-factor of the signal on the leads 14.

The output signal from the OR gate 48 also triggers the one shot and delay circuit 56 to provide a delayed ENABLE signal from the AND gate 62. The delay from the one shot 56 provides sufficient time for the ROM 58 to have determined whether or not the number transferred to from the latch 54 was a valid signal. If valid, the AND gate 62 is activated to provide the clock signal to transmit the output signal from the ROM into the output latch and thence unto the output circuitry.

If, on the other hand, the voltage pulse had preceded the current pulse, the accumulated count in the counter 50 would have been an erroneous count represented by an inordinately large number. When that large number is translated through the latch into the ROM 58, the ROM 58 recognizes that that number represents a phase angle greater than 90 degrees. Accordingly, the ROM drops the "valid" output signal to a logical zero, disenabling the AND gate 62 and triggering the one shot 64. When the one shot 64 is triggered, the $\overline{Q}$ output terminal of the flip-flop 40 becomes a logical "1", enabling the AND gates 34 and 38, and disenabling the AND gates 32 and 36. With the gates 34 and 38 enabled, it is the voltage pulse which activates the flip-flop 44 and thereby enables the counter 50 through the OR gate 46. When the lagging current pulse occurs, the flip-flop 44 is reset disenabling the counter 50 and the accumulated count is transferred to the latch 54, as before. When the flip-flop 40 has changed states, the logical "1" from the $\overline{Q}$ output terminal of the flip-flop 40 is also applied as a control signal to the input side of the ROM 58 revalidating the output of the ROM 58.

Thus, as illustrated in FIG. 8, the zero crossing signals representative of the current and voltage phase characteristics $\theta$ of the signal in the leads 14 are effectively compared and used to produce a power-factor indication $\Delta t$ which includes the determination of whether or not the current signal is leading or lagging.

Thus, there has been provided, in accordance with the present invention, an improved AC signal responsive magnetoresistive transducer which provides output pulses indicative of zero crossing characteristics of the sensed signal and may be used to provide a number of detector circuits for detecting various characteristics of applied signals.

The embodiments of the present invention in which an exclusive property or privilege is claimed are defined as follows:

1. A zero-crossing signal detector for alternating current in an electrical conductor, said detector comprising:
   a magnetoresistive bridge positioned adjacent to said conductor to be responsive to the alternating magnetic field produced about said conductor incident to the passage of said alternating current through said conductor, said bridge having a first pair of opposite arms each having a magnetoresistive element therein, and a second pair of opposite arms each having a magnetoresistive element therein, said magnetoresistive elements in said first pair of arms being oriented transversely with respect to said magnetic field and said magnetoresistive elements in said second pair of arms being oriented longitudinally with respect to said magnetic field, said bridge being electrically balanced in the absence of said field and the magnetoresistive elements in one pair of said opposite arms being magnetically saturated during a significant interval of each half cycle of said alternating current to unbalance said bridge during such intervals, and means connected to said bridge and responsive to the state of balance of said bridge to produce pulse signals indicative of each zero crossing of said alternating current.

2. A zero-crossing detector as set forth in claim 1 wherein said means connected to said bridge includes a DC energizing current connected across one diagonal of said bridge and a differential amplifier connected across the other diagonal of said bridge.

3. Apparatus for detecting the presence of an alternating current in a conductor comprising:

a zero-crossing signal detector including a magnetoresistive bridge positioned adjacent to said conductor to be responsive to the alternating magnetic field produced about said conductor incident to the passage of said alternating current through said conductor, said bridge having a first pair of opposite arms each having a magnetoresistive element therein, and a second pair of opposite arms each having a magnetoresistive element therein, said magnetoresistive elements in said first pair of arms being oriented transversely with respect to said magnetic field and said magnetoresistive elements in said second pair of arms being oriented longitudinally with respect to said magnetic field, said bridge being electrically balanced in the absence of said field and the magnetoresistive elements in one pair of said opposite arms being magnetically saturated during a significant interval of each half cycle of said alternating current to unbalance said bridge during each such interval, means connected to said bridge and responsive to the state of balance of said bridge to produce pulse signals indicative of each zero crossing of said alternating current, and pulse detector means connected to be responsive to said pulse signals to produce an output signal indicative of the presence of alternating current in said conductor.

4. Apparatus as set forth in claim 3 wherein said means connected to said bridge includes a DC energizing current connected across one diagonal of said bridge and a differential amplifier connected across the other diagonal of said bridge, said pulse detector means being connected to the output of said amplifier.

5. Apparatus as set forth in claim 4 wherein said pulse detector means includes storage means to produce an envelope signal representative of said pulse signals and comparator means for comparing said envelope signal with a reference signal.

6. Apparatus for detecting the amplitude of alternating current signals in a conductor comprising:

a zero-crossing detector including a magnetoresistive bridge positioned adjacent to said conductor to be responsive to the alternating magnetic field produced about said conductor incident to the passage of said alternating current signals through said conductor, said bridge having a first pair of opposite arms each having a magnetoresistive element therein, and a second pair of opposite arms each having a magnetoresistive element therein, said magnetoresistive elements in said first pair of arms being oriented transversely with respect to said magnetic field and said magnetoresistive elements in said second pair of arms being oriented longitudinally with respect to said magnetic field, said bridge being electrically balanced in the absence of said field and the magnetoresistive elements in one pair of opposite arms being magnetically saturated during a significant interval of each half cycle of said alternating current signal to unbalance said bridge during each such interval, means connected to said bridge and responsive to the state of balance of said bridge to produce pulse signals indicative of each zero-crossing of said alternating current signals, each pulse being of a width representative of the instantaneous amplitude of said alternating current signals, and pulse width detector means connected to be responsive to said pulse signals to produce an output signal indicative of the instantaneous amplitude of said alternating current signals in said conductor.

7. Apparatus as set forth in claim 6 wherein said means connected to said bridge includes a DC energizing current connected across one diagonal of said bridge and a differential amplifier connected across the other diagonal of said bridge, said pulse width detector means being connected to the output of said amplifier.

8. Apparatus for detecting the power factor of an alternating current signal in an electrical conductor means comprising:

a first zero-crossing detector coupled to said conductor means to produce pulse signals indicative of the zero-crossing of the current phase of said alternating current signal in said conductor means, and a second zero-crossing detector coupled to said conductor means to produce pulse signals indicative of the zero-crossing of the voltage phase of said alternating current signal in said conductor means;

each of said zero-crossing detectors including a magnetoresistive bridge positioned adjacent to said conductor means to be responsive to the alternating magnetic fields produced about said conductor means incident of the passage of said alternating current signals through said conductor means;

each of said bridges having a first pair of opposite arms each having a magnetoresistive element therein, and a second pair of opposite arms each having a magnetoresistive element therein, said magnetoresistive elements in each of said first pair of arms being oriented transversely with respect to the associated magnetic field, and said magnetoresistive elements in each of said second pair of arms being oriented longitudinally with respect to the associated magnetic field;

each of said bridges being electrically balanced in the absence of the respective magnetic field, and the magnetoresistive elements of one pair of said opposite arms of each bridge being magnetically saturated during a significant interval of each half cycle of said alternating current signals, respectively to unbalance the associated one of said bridges during such intervals, means connected to each of said bridges and responsive to the state of balance of said bridges to produce pulse signals indicative of each zero-crossing of the associated alternating signals, and power factor determining means connected to be responsive to said pulse signal from both of said bridges to produce an output signal indicative of the power factor of the alternating current signals on said conductor means.

9. Apparatus as set forth in claim 8 wherein said conductor means comprise two conductive lines and including means for producing an auxiliary current signal commensurate with the instantaneous voltage across said lines, said second zero-crossing detector being coupled to respond to said auxiliary current signal.

10. Apparatus as set forth in claim 9 wherein said power factor determining means includes timing means for determining the time displacement of the pulses from one of said bridges with respect to the pulses from the other of said bridges, and means responsive to said time displacement for producing an output signal indicative of said power factor.

* * * * *